US006404873B1

United States Patent
Beyda et al.

(10) Patent No.: US 6,404,873 B1
(45) Date of Patent: Jun. 11, 2002

(54) SUBCONFERENCE CALLING IN A TELEPHONY-OVER-LAN ENVIRONMENT

(75) Inventors: William Joseph Beyda, Cupertino; Shmuel Shaffer, Palo Alto, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/204,206

(22) Filed: Dec. 1, 1998

(51) Int. Cl.[7] .................................................. H04M 3/42
(52) U.S. Cl. ............................ 379/202.01; 379/204.01; 379/205.01
(58) Field of Search ................................ 379/202–206, 379/265, 266; 370/260–265

(56) References Cited

U.S. PATENT DOCUMENTS

| 4,796,293 A | | 1/1989 | Blinken et al. .............. 379/202 |
| 5,034,947 A | * | 7/1991 | Epps ........................... 370/268 |
| 5,373,549 A | | 12/1994 | Bales et al. .................... 379/93 |
| 5,483,588 A | * | 1/1996 | Eaton et al. ................. 379/202 |
| 5,619,555 A | * | 4/1997 | Fenton et al. ................. 379/67 |
| 5,844,979 A | * | 12/1998 | Raniere et al. ............. 379/202 |
| 5,916,302 A | * | 6/1999 | Dunn et al. .................. 709/204 |
| 6,178,237 B1 | * | 1/2001 | Horn ............................ 379/202 |

* cited by examiner

Primary Examiner—Ahmad F. Matar
Assistant Examiner—Hector Agdeppa (57) ABSTRACT

A method and system for establishing and managing subconference calls within a main conference call includes a subconference call subsystem which responds to a subconference call request from a first terminal during the main conference call by transmitting the subconference call request to a second terminal. The subconference call subsystem monitors a connection to the second terminal to detect a signal indicating acceptance of the request. Upon detecting an acceptance, the subconference call subsystem establishes a first subconference call and a data mixer mixes first voice data from the main conference call with simultaneously transmitted second voice data generated from the first and second terminals. A data router transmits the mixed first and second voice data to the first and second terminals without transmitting the second voice data to any of the other terminals participating in the main conference call. Furthermore, the process of establishing subconference calls is transparent to the other main conference terminals. The subconference call terminal subsystem can establish a second subconference call and can switch a terminal for bi-directional voice transmissions within the main conference call, the first subconference call, or the second subconference call.

17 Claims, 7 Drawing Sheets

SUBCONFERENCE CALLING IN A TELEPHONY-OVER-LAN ENVIRONMENT

BACKGROUND OF THE INVENTION

The present invention relates generally to telecommunications systems and methods and, more specifically, to a system and method for establishing and managing subconference calls within a main conference call.

DESCRIPTION OF THE RELATED ART

Advances in telecommunications have made available teleconferencing features that more closely approximate a face-to-face meeting for individuals who are located at substantial distances from each other. For example, the higher bandwidth provided by networks such as the Integrated Services Digital Network (ISDN) enables voice, video, and textual/graphic data to be transmitted to and from each party in a teleconferencing call. The ability to include video and textual/graphic data within the teleconferencing call more closely approximates the visual presentations which are part of face-to-face meetings.

Interactions between the parties during a multimedia teleconferencing call still face substantial constraints. Subtle visual cues between parties in a face-to-face meeting can provide non-verbal information which might not be captured completely on video. Furthermore, in negotiations in which a group representing a single interest is seated together, that group will often engage in informal discussions in hushed tones while someone else at the table continues to address the entire conference. Conventional teleconferencing technology is not well suited to these types of subconferences.

Conference calls can be set up and controlled by telephone operators who selectively add and drop individuals to and from a conference call. The operators can maintain a visual display of individuals in the conference call by name and by telephone number. An improvement to the operator-controlled teleconferencing system is described in U.S. Pat. No. 4,796,293 to Blinken et al., in which a service computer performs the call set-up functions previously performed by the telephone operators. A conference call coordinator, who also participates in the call, establishes communication with the service computer from the coordinator's computer terminal via a packetized data system. Once communication with the service computer is established, the coordinator has the same capabilities to add and drop individuals from the conference call as an operator.

U.S. Pat. No. 5,373,549 to Bales et al. describes a multi-level conference management system in which a party in a first telephone conference can combine the first telephone conference with a second telephone conference already in process. The party who coordinated the combination of the two conferences has the ability to control all of the parties on the first telephone conference, such that the coordinating party can disconnect the parties within the first telephone conference from the parties on the second conference and subsequently reconnect the parties. By disconnecting and reconnecting the first conference, the coordinating party can effectively establish a subconference call within the combined conference call.

Although the Bales et al. conference management system represents an improvement over prior teleconferencing systems, the system falls short of providing a means by which participants in a conference call can establish a subconference call without the other conference call parties being aware of the formation of the subconference call. The computer terminal of each coordinator of the combined conference call displays the names and telephone numbers of all parties in the call. Consequently, when a coordinator drops parties from the conference call to establish a subconference call, the other coordinators in the conference call are able to detect that some of the parties have been dropped. Furthermore, in order to establish a subconference call, the parties to the subconference call must first be disconnected from the conference call.

What is needed is a system and a method for transparently establishing subconference calls during a conference call in a manner which enables the subconference call parties to receive voice information from the conference call during the subconference call.

SUMMARY OF THE INVENTION

A method for managing subconference calls during a main conference call includes the steps of establishing a first subconference call and transmitting voice data over the first subconference call without transmitting the voice data over the main conference call. The first subconference call is established by providing connectivity within a subset of the terminals that are participating within the main conference call. Voice information generated at a terminal within the subset is isolated to transmissions to other terminals within the subset. However, voice information generated at a terminal participating in the main conference call, but not the first subconference call, is universally transmitted. A "terminal" as used herein may be a telephone or may be a computing device having telephony capabilities.

In the preferred embodiment, the invention is practiced in a packet-based data network, such as a local area network (LAN). The main conference call and the first subconference call are voice-over-data-network calls, such as internet protocol (IP) telephony calls. The main IP telephony conference call is established utilizing conventional IP telephony methods. Subsequently, a first terminal within the main conference call transmits a first subconference call request to a second terminal that is also entered in the main conference call. The first subconference call request preferably includes an option to reject the request and includes a text message indicating the intended subject matter for the first subconference call, so that a user of the second terminal can decide whether to accept the first subconference call request. A connection to the second terminal is monitored for an acceptance of the request and, if the acceptance is detected, the first subconference connection is established. The first subconference call is established in parallel with the main conference call, so that the first and second terminals remain as voice-receiving participants of the main conference call, instead of being disconnected from the main conference call. Furthermore, the call set-up procedure for the first subconference call is transparent to the other terminals on the main conference call.

During the first subconference call, voice data transmitted from the first terminal is addressed only to the second terminal and voice data transmitted from the second terminal is addressed only to the first terminal. Consequently, terminals other than the first and the second terminals in the main conference call do not receive the voice data generated in the first subconference call. Nevertheless, the voice information generated in the main conference call is mixed with voice data generated from the first and second terminals, so that the users of the first and second terminals are able to hear conversations taking place in the main conference call concurrently with the conversation taking place in the first subconference call.

Additional terminals can be added to the first subconference call, and each terminal is capable of rejoining two-way conversations within the main conference call at any time. Furthermore, each terminal in the first subconference call can transmit a request to another terminal in the main conference call to establish a second subconference call that is isolated from the main conference call and the first subconference call. For example, the second terminal might transmit a second subconference call request to a third terminal to establish a second subconference call. If the request is accepted and the second subconference is established, the second terminal can subsequently rejoin two-way conversations within either the first subconference call or the main conference call. The transfers between subconference calls and the main conference call are all transparent to the other terminals in the main conference.

A system for establishing and managing subconference calls within a main conference call includes a gatekeeper with a conference call subsystem to establish a main conference call between multiple IP telephony terminals. The gatekeeper also includes a subconference call subsystem that is responsive to a subconference call request to transmit the call request from a first terminal to a second terminal. The subconference call subsystem responds to an acceptance of the call request by establishing a first IP telephony subconference between the first and second terminals.

A data router routes voice data transmitted from terminals participating in the first subconference call exclusively to other terminals participating in the subconference call, thereby preventing the other terminals within the main conference call from receiving subconference call voice data. A multipoint control unit (MCU) mixes the voice data from the main conference call with subconference voice data for presentation of the mixed voice data at the subconference terminals. The MCU function can be centrally located, for instance in the gatekeeper, or it can be distributed in the subconference terminals.

The subconference call request can include instructions to set up a multimedia subconference call. For example, the subconference call might include a whiteboard feature for presentation of textual and graphic visual data. The MCU mixes whiteboard data from the main conference call with whiteboard data from the subconference call in a manner which distinguishes the main conference whiteboard data from the subconference whiteboard data.

The subconference call subsystem is capable of establishing a second subconference call in response to a second subconference call request from a terminal participating in the first subconference call. A subconference call transfer request triggers the subconference call subsystem to either transfer a terminal from one subconference call to another, from a subconference call to the main conference call, or from the main conference call to a subconference call.

DETAILED DESCRIPTION

Figure 1:
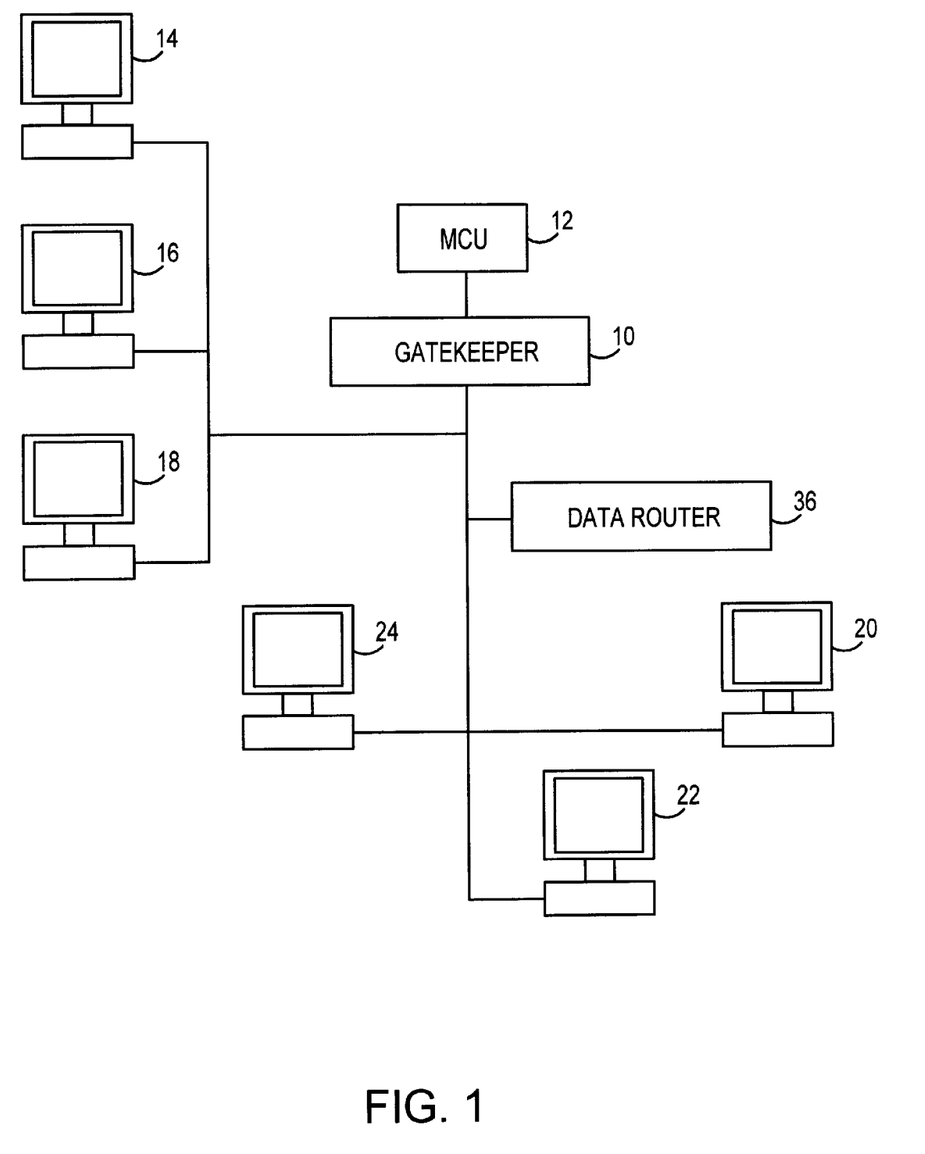
FIG. 1 is a schematic diagram of a communications network according to the present invention for establishing and managing subconference calls.

With reference to FIG. 1, a packet-based communications network, such as a local area network (LAN), includes a gatekeeper 10 for controlling access to multiple communication devices on the LAN. The communication devices are preferably Internet protocol (IP) telephony-enabled computers such as first 14, second 16, third 18, fourth 20, fifth 22, and sixth 24 IP telephony terminals. A multipoint control unit (MCU) 12 provides voice mixing capabilities required for conference calls. A data router 36 provides routing function for network traffic on the LAN. Alternatively, the routing function can be performed by a switch, a hub, or a bridge attached to the LAN. FIG. 1 is an illustration of a basic communication network which can be utilized to perform the subconferencing call set up and management of the present invention, but more sophisticated network configurations can be utilized.

Figure 2:
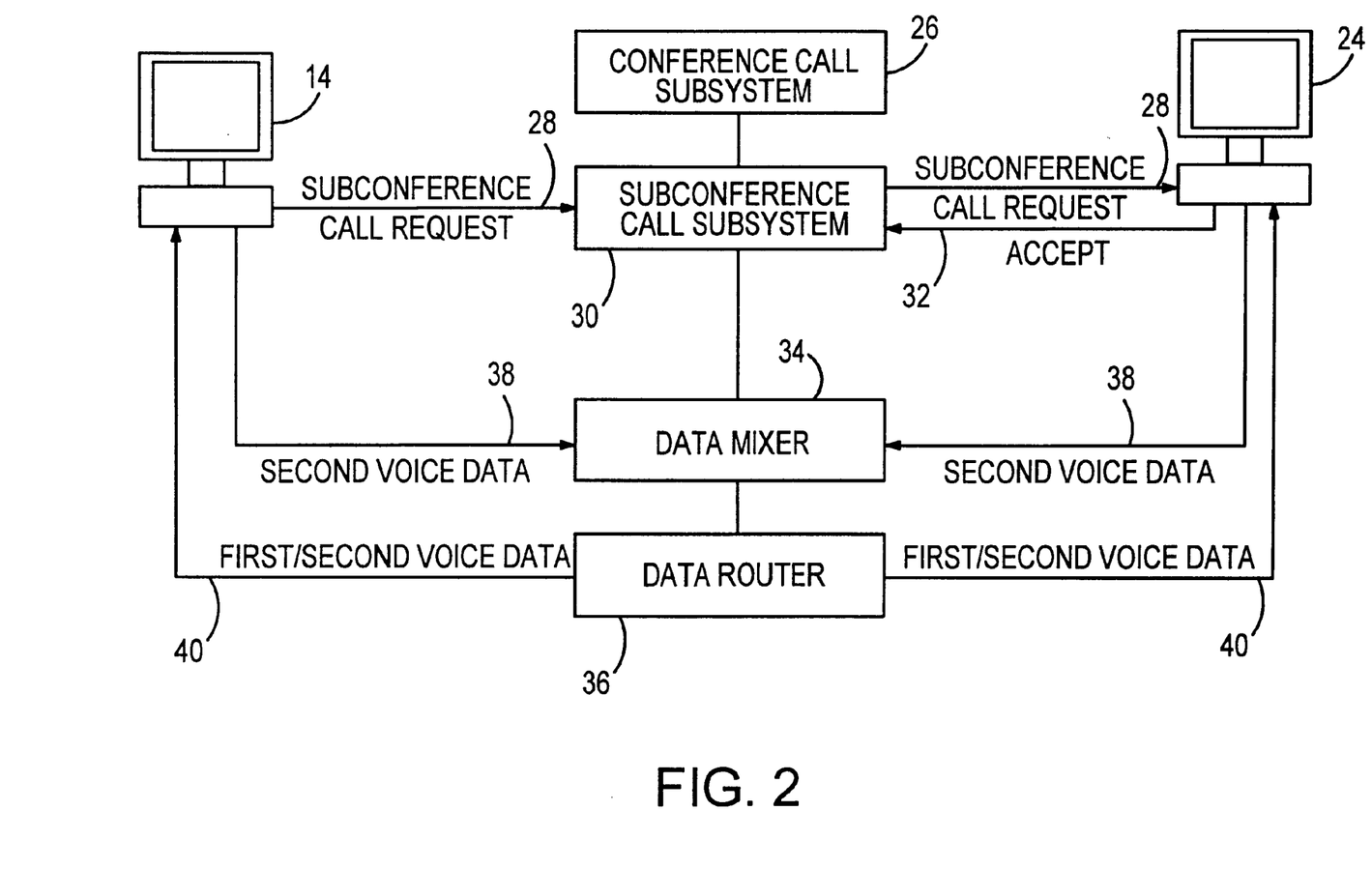
FIG. 2 is a block diagram of the functional components of a system for establishing and managing subconference calls within the network of FIG. 1.

With reference to FIGS. 1 and 2, a conference call subsystem 26 is configured to establish an IP telephony conference call according to known procedures. After the conference call subsystem 26 establishes connectivity for the main conference call among the first 14, second 16, third 18, fourth 20, fifth 22, and sixth 24 terminals, first terminal 14 transmits a subconference call set-up request 28 to another conference call terminal, for example to sixth terminal 24, in order to establish a subconference call with sixth terminal 24. The call set-up request includes a message identifying the requesting party. Preferably, the requesting party has the option of including a text message with the call set-up request, which indicates the proposed subject matter of interest to the first terminal user. Based on the included message, the sixth terminal user can decide whether to accept the proposed subconference call. The text message can be in the form of an e-mail message to the sixth terminal user, but other message-exchange techniques may be used.

A subconference call subsystem 30 receives the call setup request and, after transmitting the request to the sixth terminal 24, monitors a connection to the sixth terminal for an acceptance of the call set-up request. Upon receiving an acceptance 32, the subconference call subsystem 30 establishes a first subconference call. The subconference call subsystem 30 establishes the call in a manner that is transparent to the other terminals 16, 18, 20, and 22 in the main conference call. As part of the call set up, the subconference subsystem 30 requires that all voice data generated from first terminal 14 and sixth terminal 24 be transmitted only to participants in the first subconference call and that voice data from the main conference call be transmitted to all terminals participating in the first subconference call. Although not critical to the invention, the conference call subsystem 26 and the subconference call subsystem 30 can be located within the gate keeper 10.

After the first subconference call has been established, data router 36 transmits voice data generated from first terminal 14 and sixth terminal 24, designated as second voice data 38 in FIG. 2, over the first subconference call, but not over the main conference call. A data mixer 34 mixes the second voice data with first voice data from the main conference call, resulting in mixed first/second voice data 40. The data mixing function can be performed in the MCU 12, or the first and second voice data can be transmitted separately to each terminal 14 and 24, with each terminal having a digital signal processor for mixing the first and second voice data. The data mixer is preferably configured to mix second voice data at a higher level than first voice data, so that parties to the first subconference call are able to discern conversations in the first subconference call more easily than main conference call conversations. The mixing level of the first voice data should be sufficiently high for the subconference call parties to be able to track conversations so that, if one of the subconference call parties is addressed in the main conference call, that party can rejoin the main conference call to respond. The data mixer 34 can also be configured to mix whiteboard data and video data from the main conference call with whiteboard data and video data from the subconference call. For example, whiteboard data from the main conference call can be set off from subconference call whiteboard data by presenting the main conference call whiteboard data in a different color from the subconference call whiteboard data. The data router 36 routes the mixed first and second data 40 to the parties to the first subconference call, namely first terminal 14 and sixth terminal 24 in FIG. 2.

Figure 3:
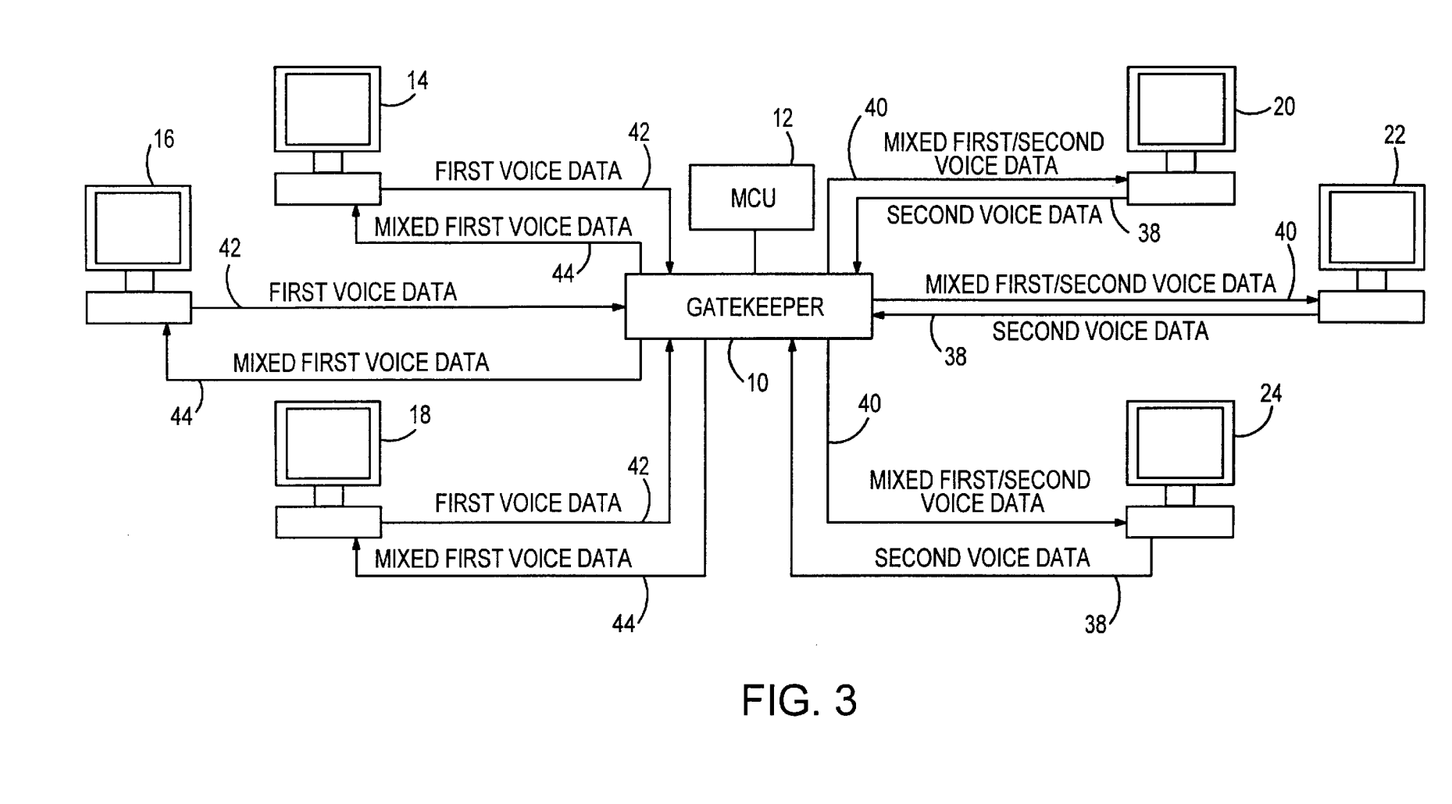
FIG. 3 is a schematic diagram illustrating the flow of voice information over a main conference call and a subconference call within the communications network of FIG. 1.

Referring to FIG. 3, a conventional main conference call between first 14, second 16, and third 18 terminals includes first voice data 42 which is transmitted to the MCU 12 via the gateway, where it is mixed with other simultaneously transmitted first voice data before the mixed first voice data 44 is transmitted to the main conference call terminals. For example, if first voice data 42 is generated from first and third terminals simultaneously (i.e., first terminal user speaks at the same time as second terminal user), first voice data is transmitted from both the first terminal 14 and the third terminal 18 to the MCU 12, where the two sets of simultaneously transmitted first voice data 42 are mixed. If only one party in the main conference is speaking, there is no need to perform any voice data mixing and the first voice data is transmitted to the other terminals in the main conference as unmixed first voice data. The mixed first voice data 44 and unmixed first voice data are transmitted to all terminals within the main conference call.

Fourth 20, fifth 22, and sixth 24 terminals have established a subconference call within the main conference call. All second voice data 38 generated from any one of the subconference terminals is transmitted to MCU 12 via gateway 10, where it is mixed with first voice data 42 and unmixed second voice data from other subconference call terminals. For example, if fourth 20 and sixth 24 terminals transmit second voice data simultaneously, both sets of second voice data 38 are transmitted to MCU 12, where the two sets of simultaneously transmitted voice data are mixed with first voice data from the main conference call. The mixed first and second voice data 40 is transmitted to the subconference call terminals without being transmitted to the main conference call terminals. However, because the subconference terminals receive first voice data, the subconference terminal users are able to respond to conversation in the main conference by transferring back to the main conference.

Figure 4:
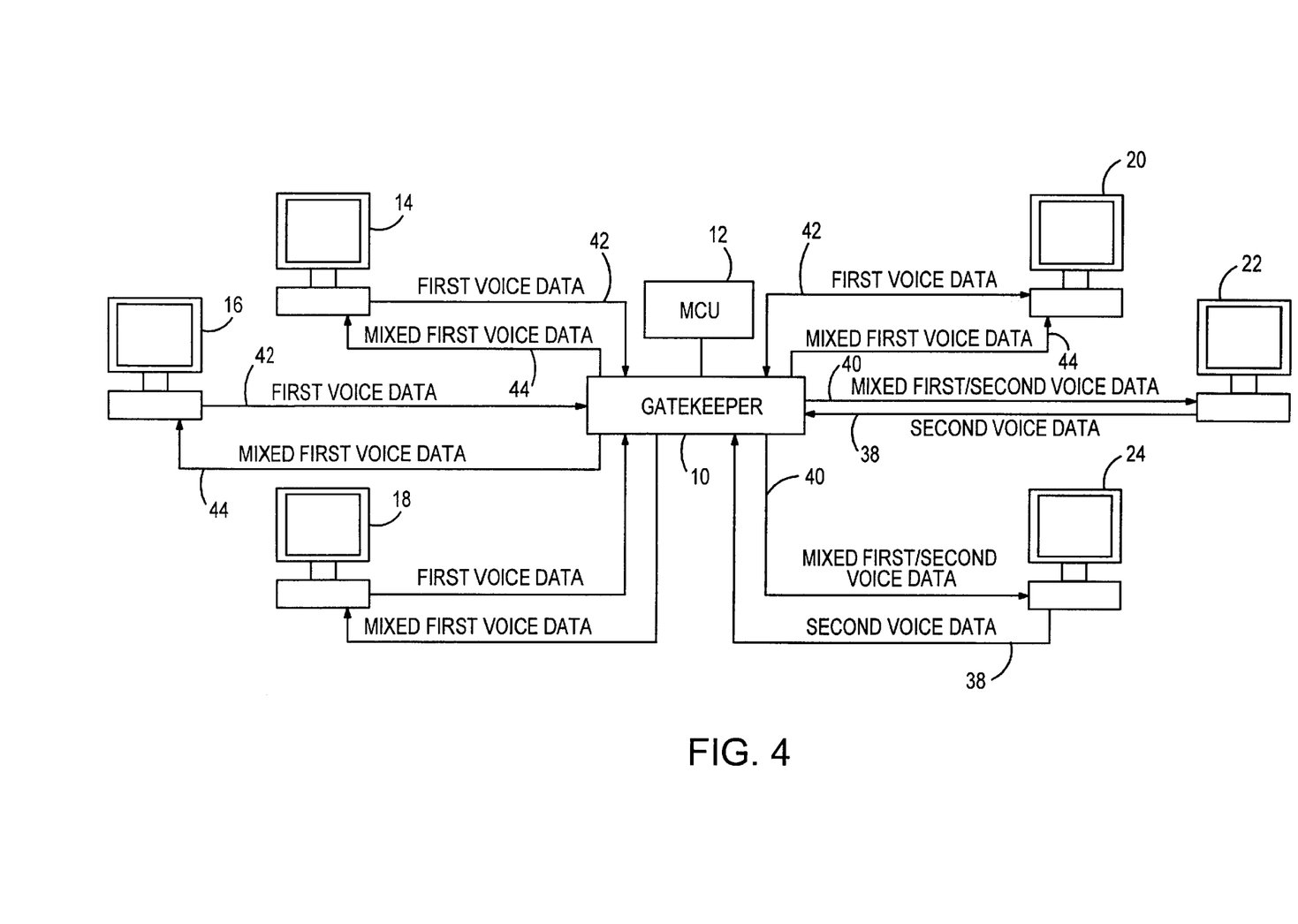
FIG. 4 is a schematic diagram illustrating the flow of voice information over the main conference call and the subconference call in FIG. 3 after one of the subconference call terminals has rejoined the main conference call.

Referring to FIG. 4, the fourth terminal 20 may transfer from the subconference call to rejoin bi-directional transmissions within the main conference call by transmitting a transfer request to the gatekeeper 10. Following the transfer, the gateway will recognize all voice data generated from fourth terminal 20 as first voice data and, accordingly, the MCU 12 will mix the first voice data from the fourth terminal with other simultaneously transmitted first voice data, if there is any. The mixed first voice data 44 is then transmitted to the other main conference call terminals 14, 16, and 18, in addition to being mixed with second voice data 38 for transmission within the subconference call. Once fourth terminal 20 has rejoined the main conference, it no longer receives second voice data 38 from the subconference.

Figure 5:
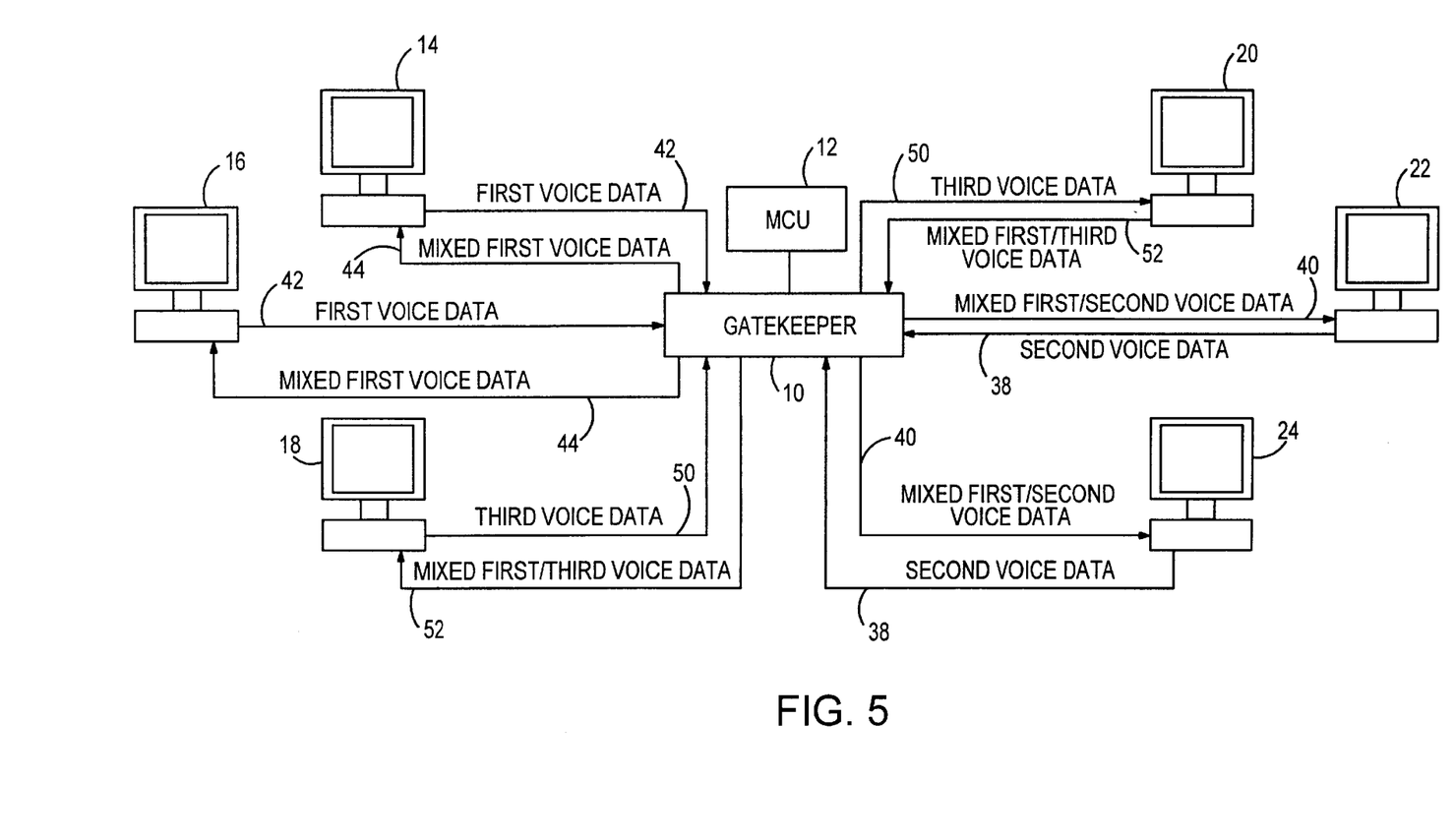
FIG. 5 is a schematic diagram illustrating the flow of voice information over the main conference call and the subconference call of FIG. 4 after a second subconference call has been formed.

Referring to FIG. 5, fourth terminal 20 can establish a second subconference call from either the first subconference call or the main conference call. After transmitting a second subconference request to the third terminal 18 via the gatekeeper 10, the gatekeeper establishes the second subconference call in response to receiving an acceptance from the third terminal 18. The MCU 12 mixes first voice data 42 or mixed first voice data 44 from the main conference call with third voice data 50 generated by third 18 and fourth 20 terminals. Mixed first/third voice data 52 are transmitted over the second subconference call. From the second subconference call, the fourth terminal 20 can transfer to either the first subconference call or the main conference call. When a subconference call is established, at any time during the subconference call, any terminal participating in the subconference call can transfer to bi-directional transmissions within the main conference call. Furthermore, any terminal which has participated in more than one subconference call which is currently in existence can transfer among each of those subconference calls and the main conference call.

Figure 6:
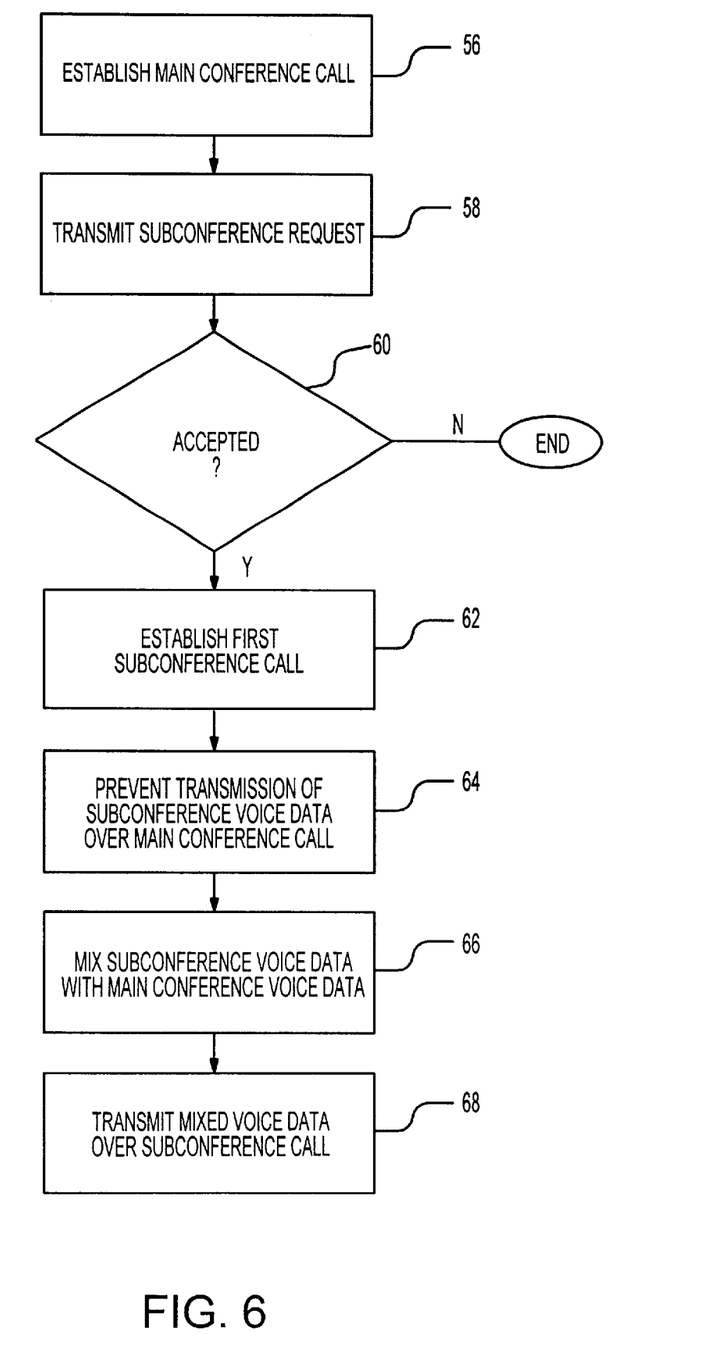
FIG. 6 is a process flow of a method for establishing and managing subconference calls utilizing the system shown in FIG. 2.

With reference to FIGS. 2, 3 and 6, a method for establishing and managing subconference calls includes the step 56 of establishing a main conference call. In a preferred embodiment, the conference call is a voice-over-data-network conference call, such as an IP telephony call, which is established according to conventional techniques. In step 58, one of the terminals in the main conference call, for example the first terminal 14, transmits a subconference call request 28 via gatekeeper 10 to the sixth terminal 24. The subconference subsystem 30 monitors a connection to the sixth terminal 24 for an acceptance 32 of the request in step 60. If the request is rejected, the subconference is not established and no further steps are taken. If the acceptance 32 is detected, in step 62 the subconference subsystem 30 establishes a first subconference call between the first 14 and sixth 24 terminals. Upon establishing the first subconference call, the data router 36 recognizes any voice data transmitted from either the first 14 or sixth 24 terminals as being specific to the subconference call. Generally speaking, any voice data transmitted from a terminal which is part of a subconference call is transmitted to all other terminals in the subconference call. For example, in FIG. 3, the sixth terminal 24 is participating in a subconference call with the fourth 20 and fifth 22 terminals, so that second voice data 38 generated from the sixth terminal 24 is transmitted to both the fifth and sixth terminals.

In step 64, the subconference subsystem prevents any second voice data 38 from the first subconference call from being transmitted over the main conference call. In step 66, the data mixer 34 mixes first voice data 42 from the main conference call with second voice data 38 and, in step 68, mixed first/second voice data 40 is transmitted over the first subconference call. The mixing of first and second voice data enables participants in the subconference call to listen to main conference call conversations, and to respond by either rejoining the bi-directional transmissions within the main conference call or establishing a second conference call.

Referring to FIGS. 3, 4, 5 and 7, after the first subconference call is established, the subconference subsystem 30 monitors the main conference call and the first subconference call for a second request to establish a second subconference call. Upon receiving a second subconference call request in step 70 from the fourth terminal 20, the subconference call subsystem 30 transmits the second request to the third terminal 18 and monitors the connection to the third terminal in step 72 for an acceptance of the second request. If the request is not accepted, the second subconference call is not established and no further steps are taken. If the request is accepted, in step 73 the subconference subsystem 30 establishes a second subconference call. The data mixer 34 receives third voice data 50 generated from the third 18 and fourth 20 terminals and mixes the third voice data 50 in step 74 with first voice data 42 from the main conference call. In step 75, the data router 36 transmits mixed first/third voice data 52 exclusively to participants in the second subconference call, namely third 18 and fourth 20 terminals.

Figure 7:
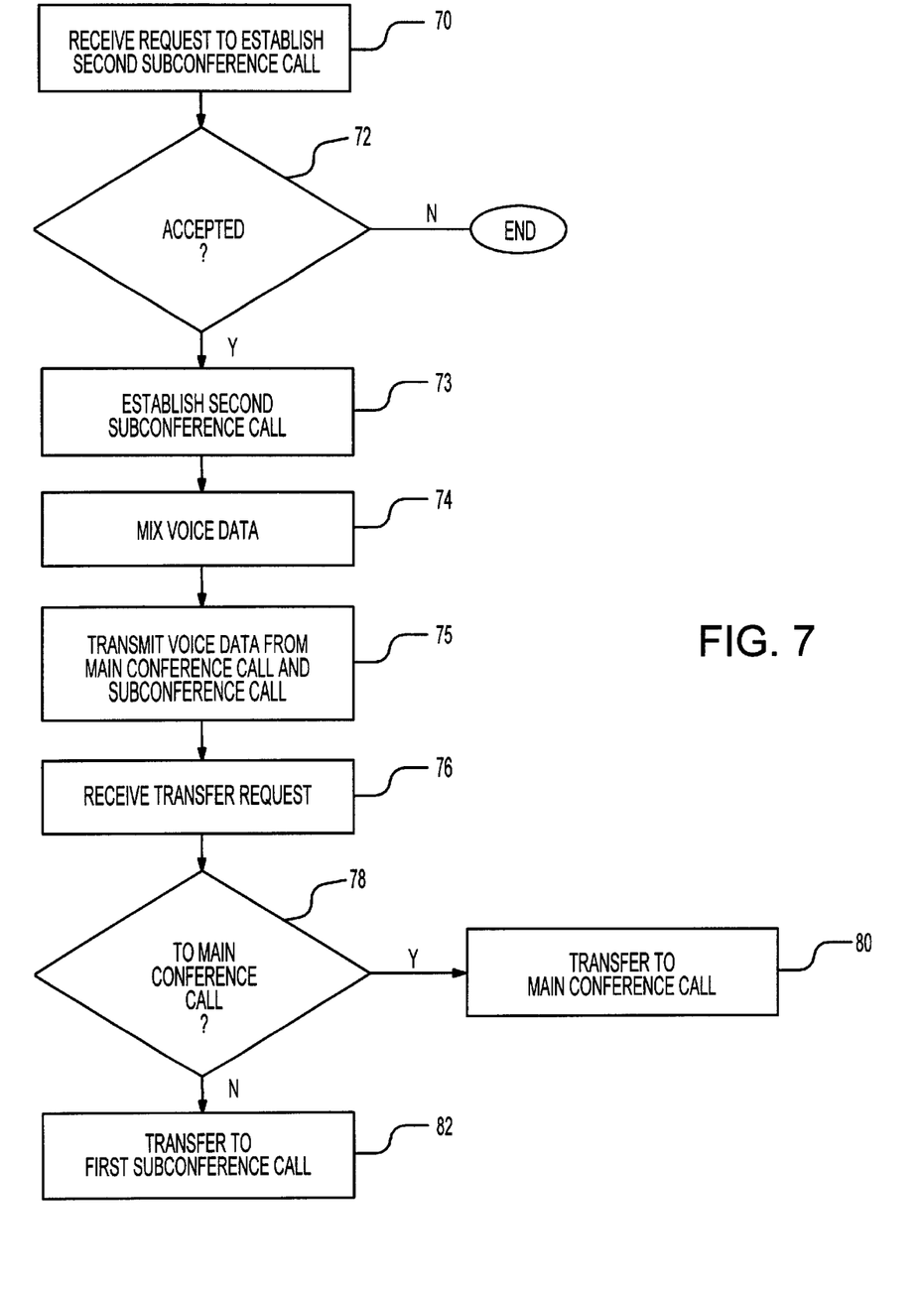
FIG. 7 is a process flow of a method for establishing and managing a secondary subconference call shown in FIG. 5.

In step 76, the subconference subsystem 30 receives a transfer request from the fourth terminal 20. The fourth terminal 20 can either rejoin the first sub-conference call or the main conference call and, in step 78, subconference subsystem 30 determines whether the request is a request to transfer to the main conference call. If the request is determined to be a request to rejoin bi-directional transmissions within the main conference call, in step 80, the subconference subsystem 30 transfers the fourth terminal 20 to the main conference call. If it is determined that the transfer request is a request to rejoin the first subconference call, in step 82, the fourth terminal 20 is transferred to the first subconference call. Furthermore, if additional terminals besides the third 18 and fourth 20 terminals were included in the second subconference call at the time that the fourth terminal 20 transferred from the second subconference call, the fourth terminal could rejoin the second subconference call after transferring out of the second subconference call.

The subconferencing system and method of the present invention closely approximate actual conference room behavior by enabling conferees to establish subconferences during the main conference, while still being able to listen in on the main conference conversations. Furthermore, subconferees are able to rejoin full participation within the main conference after establishing a subconference. Conferees can establish a subconference call to discuss an issue exclusively with a particular conferee, if the issue touches on sensitive subject matter or if the issue is of interest only to that conferee. Additionally, the establishment of the subconference call is transparent to the other conferees, so that the existence of the subconference call is shielded from the other conferees.

What is claimed is:

1. A method for establishing and managing private conference consultations during a main conference call comprising the steps of:

establishing connectivity for said main conference call, including linking a plurality of terminals for two-way transmissions of voice information among at least three terminals;

during said main conference call, establishing connectivity for a first private subconference call between a subset of said plurality of terminals which includes a first terminal and a second terminal of said main conference call, said connectivity, including a first request for establishing said connectivity, being established in a manner transparent to terminals in said main conference call other than said subset of terminals;

transmitting first voice information generated by said subset of terminals over said first private subconference call in the absence of transmitting said first voice information over said main conference call; and mixing second voice information transmitted over said main conference call with said first voice information for presentation at said subset of terminals, said second voice information thereby being general to said main conference call, while said first voice information is specific to said first subconference call.

2. The method of claim 1 further comprising transmitting said first request to establish said first private subconference call from said first terminal to said second terminal, said first request being a call signal that triggers an option to reject said first request.

3. The method of claim 2 wherein said step of establishing said first private subconference call occurs at least partially in response to said second terminal generating a response signal indicative of an acceptance of said first request.

4. The method of claim 1 further comprising the steps of:

receiving a request from one of said first and said second terminals to rejoin said main conference call with respect to two-way transmissions of voice information; and automatically transferring said one of said first and said second terminals from said private subconference call to said main conference call in a manner that is transparent to said plurality of terminals participating in said main conference call other than said subset of terminals.

5. The method of claim 1 further comprising the steps of:

transmitting a second request for a second private subconference all from said first terminal to a third terminal participating in said main conference call;

if said third terminal accepts said second request, establishing connectivity for said second private subconference call;

simultaneously transmitting over said second private subconference call third voice information generated by said third terminal and said first terminal in the absence of transmitting said third voice information over said main conference call and said first subconference call; and mixing said second voice information with said third voice information for presentation at said first and third terminals.

6. The method of claim 5 further comprising the steps of:

receiving a request from said first terminal to rejoin said first private subconference call with respect to two-way transmissions; and transferring said first terminal to said first private subconference call in response to said request to rejoin said first private subconference call.

7. The method of claim 5 further comprising the steps of:

receiving a request from one of said first, said second, and said third terminals to rejoin said main conference call with respect to two-way transmissions of voice information; and transferring said one of said first, said second, and said third terminals to said main conference in a manner that is transparent to said plurality of terminals participating in said main conference call other than said terminals participating in one of said first and second subconference calls from which said transfer occurs.

8. The method of claim 1 wherein said step of establishing connectivity for said first private subconference call includes transmitting a first request to establish said private subconference call from said first terminal to said second terminal, said first request including a text message indicative of proposed subject matter for said first private subconference call.

9. A system for establishing subconference calls during a main conference call comprising:

means for establishing a primary conference call between at least three conferees;

means, responsive to a first user-generated subconference call request, for establishing a first subconference call between a subset of at least two and less than all of said conferees in a manner that is transparent to a first remainder of said conferees, said means for establishing said first subconference call being configured to transmit a text message together with said subconference call request from a requesting conferee of said subset to each invited conferee of said subset, said establishing means for said first subconference call including a call request procedure that is transparent to said first remainder of said conferees, said text message being representative of proposed subject matter for said first subconference call;

means for isolating transmissions of first subconference voice information to said subset of conferees such that said transmissions are transparent to said first remainder, said first subconference voice information being generated at one of said conferees of said subset; and means for mixing transmissions of primary conference voice information from said first remainder of conferees with said transmissions of said first subconference voice information for presentation at said subset of conferees.

10. The system of claim 9 wherein said mixing means is further configured to mix whiteboard data generated at said first remainder of conferees with whiteboard data generated at a conferee of said subset in a manner that is transparent to said first remainder of conferees such that said whiteboard data generated at said subset is distinguished from said whiteboard data generated at said first remainder.

11. The system of claim 9 wherein said means for establishing said first subconference call is configured to establish a second subconference call between a first conferee of said subset and a third conferee of said remainder in a manner that is transparent to conferees other than said first and said third conferees.

12. The system of claim 11 wherein said means for establishing said first subconference call is configured to transfer said first conferee between said second subconference call, said first subconference call, and said primary conference call in response to subconference transfer requests received from said first conferee.

13. The system of claim 9 wherein said means for establishing said first subconference call is responsive to said user-generated subconference call request to transmit said subconference call request to a second conferee of said subset and is responsive to receiving a response signal from said second conferee indicative of an acceptance of said subconference request by said second conferee.

14. A method for initiating subconference calls between terminals participating in a main conference call comprising the steps of:

transmitting a first subconference call request from a first terminal to a second terminal, including sending a text message to said second terminal indicative of proposed subject matter for said first subconference call, said first and said second terminals being two of said terminals participating in said main conference call, said first subconference call request being undetected by said terminals participating in said main conference call other than said terminals participating in said first subconference call;

monitoring a connection to said second terminal for an acceptance of said subconference call request;

upon detecting said acceptance, establishing a first subconference call between said first terminal and said second terminal such that terminals participating in said main conference call, other than said first and said second terminals, do not detect said establishment of said first subconference call;

transmitting first voice data generated by said first and said second terminals over said first subconference call while preventing transmission of said first voice data over said main conference call; and universally transmitting second voice data generated by said terminals other than said first and second terminals such that all of said terminals receive said second voice data.

15. The method of claim 14 wherein said establishing step is a step of establishing a voice-over-data-network call.

16. The method of claim 14 further comprising the steps of:

establishing a second subconference call between said second terminal and a third terminal participating in said main conference call, including transferring said second terminal from said first subconference call to said second subconference call in a manner transparent to said terminals in said main conferencing call other than said second and said third terminals;

if a transfer to main conference call request is generated from said second terminal, returning said second terminal to said main conference call; and if a transfer to subconference call request is generated from said second terminal, returning said second terminal to said first subconference call.

17. The method of claim 14 further comprising the steps of:

transmitting first text messages over said first subconference call between said first terminal and said second terminal in a manner that is transparent to said terminals in said main conference call other than said first and said second terminals; and combining said first text messages with second text messages transmitted by said terminals in said main conference call in a manner that distinguishes sources of said first text messages and said second text messages.

* * * * *